US008325196B2

(12) United States Patent
Riemens et al.

(10) Patent No.: US 8,325,196 B2
(45) Date of Patent: Dec. 4, 2012

(54) UP-SCALING

(75) Inventors: Abraham Karel Riemens, Eersel (NL);
Patrick Fernandes Machado, Barcelos
(PT); Christiaan Varekamp, Eindhoven
(NL); **Bart Gerard Bernard
Barenbrug**, Eindhoven (NL);
Robert-Paul Mario Berretty,
Eindhovem (NL)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 1055 days.

(21) Appl. No.: 12/299,652

(22) PCT Filed: May 7, 2007

(86) PCT No.: PCT/IB2007/051701
§ 371 (c)(1),
(2), (4) Date: Nov. 5, 2008

(87) PCT Pub. No.: WO2007/132397
PCT Pub. Date: Nov. 22, 2007

(65) Prior Publication Data
US 2009/0179920 A1 Jul. 16, 2009

(30) Foreign Application Priority Data
May 9, 2006 (EP) .................................... 06113680

(51) Int. Cl.
*G09G 5/00* (2006.01)
(52) U.S. Cl. ........................................ 345/581; 345/665
(58) Field of Classification Search .................. None
See application file for complete search history.

(56) References Cited

U.S. PATENT DOCUMENTS

| | | | |
|---|---|---|---|
| 5,148,269 A | 9/1992 | De Haan | |
| 5,684,544 A * | 11/1997 | Astle | 348/708 |
| 5,727,078 A | 3/1998 | Chupeau | |
| 6,075,926 A * | 6/2000 | Atkins et al. | 358/1.2 |
| 6,625,333 B1 | 9/2003 | Wang et al. | |
| 7,319,797 B2 * | 1/2008 | Hung | 382/260 |
| 7,409,372 B2 * | 8/2008 | Staelin et al. | 706/15 |
| 7,627,034 B2 * | 12/2009 | Park et al. | 375/240.08 |
| 2005/0157792 A1 | 7/2005 | Baba et al. | |
| 2006/0221250 A1 * | 10/2006 | Rossbach et al. | 348/630 |
| 2007/0003152 A1 * | 1/2007 | Hoppe et al. | 382/240 |
| 2008/0259207 A1 * | 10/2008 | De Haan et al. | 348/452 |

FOREIGN PATENT DOCUMENTS

| | | |
|---|---|---|
| EP | 0720355 B1 | 7/1996 |
| EP | 1372335 A1 | 12/2003 |
| EP | 1489842 A2 | 12/2004 |
| GB | 2285359 A | 7/1995 |
| WO | 2004066212 A2 | 8/2004 |
| WO | WO 2004/112393 * | 12/2004 |

OTHER PUBLICATIONS

Zhao et al. Towards an overview of spatial up-conversion techniques; Proceedings of the ISCE 2002; Sep. 23-26, 2002.* P. A. Redert, et al: Synthesis of Multi Viewpoint Images At Non-Intermediate Positions, Proceedings of International Conference on Acoustics, Speech and Signal Processing, vol. 1V, ISBN 0-8186-7919-0 pp. 2749-2752 IEEE Computer Society 1997.
R. P. Berretty, et al: High Quality Images from 2.5D Video, Proceedings Eurographics, Granada, 2003, Short Presentations. pp. 1-8.

* cited by examiner

*Primary Examiner* — Kee M Tung
*Assistant Examiner* — Carlos Perromat

(57) ABSTRACT

A method of up-scaling a first structure of samples representing a first property, the first structure having a source resolution, into a second structure of samples representing the first property, the second structure having a target resolution, on basis of a third structure of samples representing a second property, the third structure having the source resolution and on basis of a fourth structure of samples representing the second property, the fourth structure of samples having the target resolution, the method comprising: assigning weight factors to respective first samples of the first structure of samples on basis of differences between respective third samples of the third structure of samples and fourth samples of the fourth structure of samples; and computing the second samples of the second structure of samples on basis of the first samples of the first structure of samples and the respective weight factors.

16 Claims, 12 Drawing Sheets

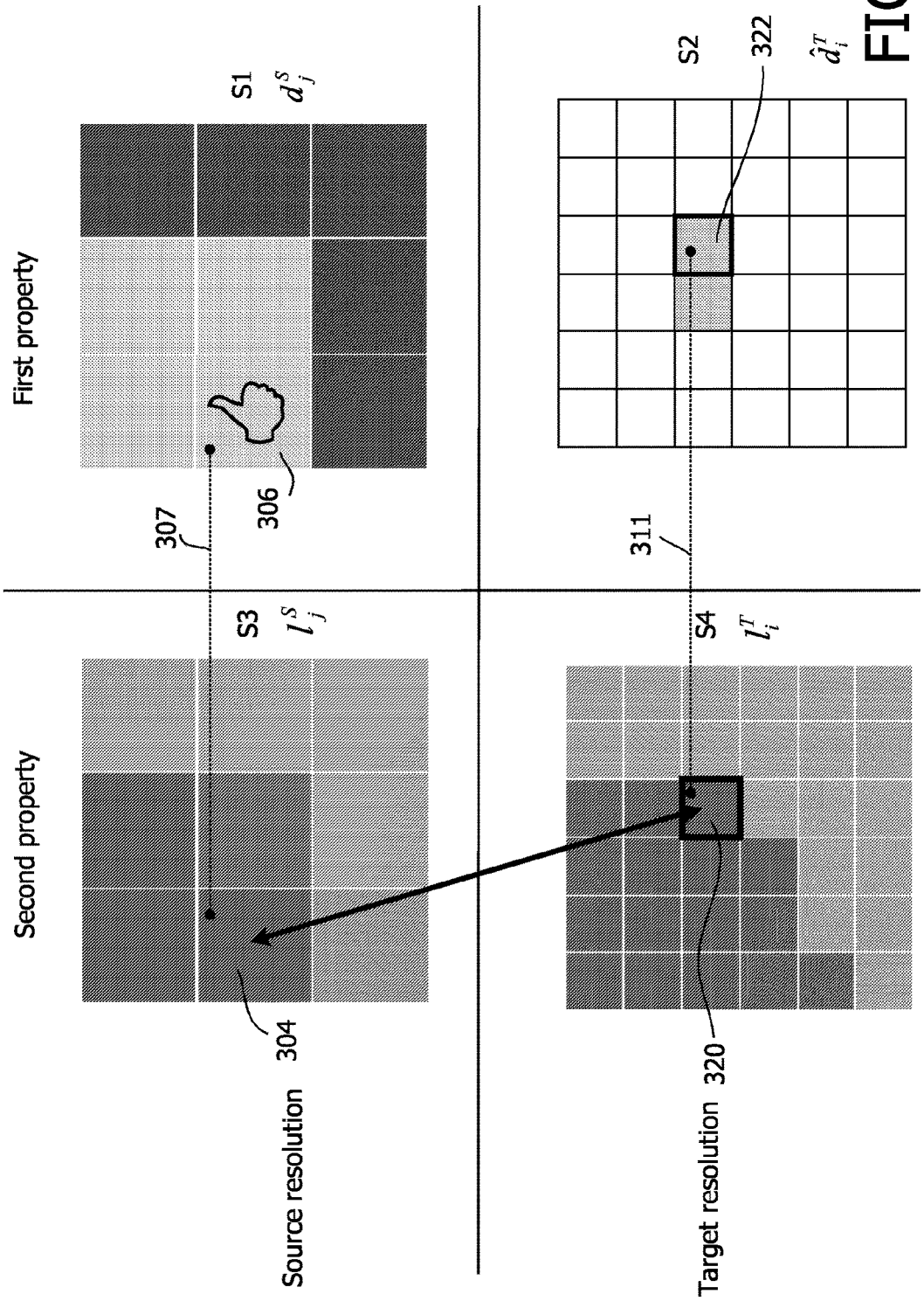

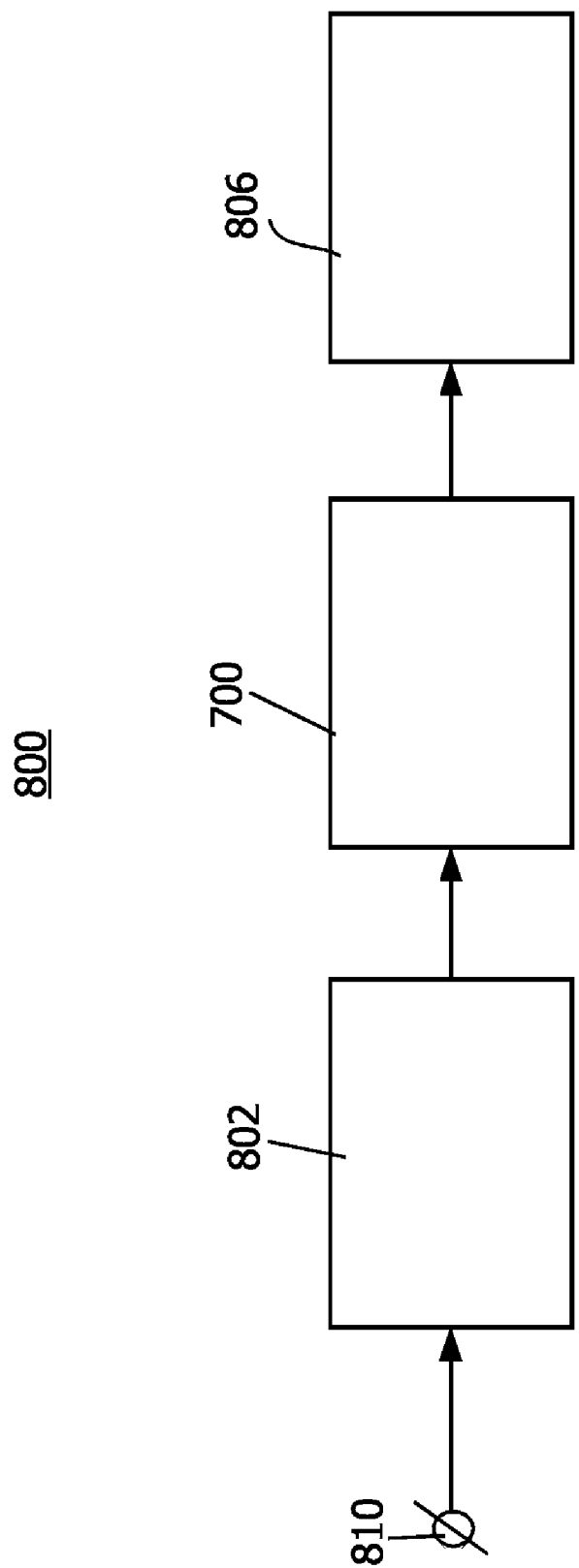

UP-SCALING

The invention relates to a method of up-scaling a first structure of samples representing a first property, the first structure having a source resolution, into a second structure of samples representing the first property, the second structure having a target resolution.

The invention further relates to an up-scaling unit for up-scaling a first structure of samples representing a first property, the first structure having a source resolution, into a second structure of samples representing the first property, the second structure having a target resolution.

The invention further relates to an image processing apparatus comprising such an up-scaling unit.

The invention further relates to a computer program product to be loaded by a computer arrangement, comprising instructions for up-scaling a first structure of samples representing a first property, the first structure having a source resolution, into a second structure of samples representing the first property, the second structure having a target resolution, the computer arrangement comprising processing means and a memory Estimation methods such as motion estimation and/or depth estimation rely on the determination of similar image parts of consecutive images. Since a single pixel value is insufficient discriminative, typically a group of pixels is used for establishing correspondence between image parts of consecutive images. As a result the output of an estimation method, e.g. a motion vector field in the case of motion estimation, has a lower resolution than the resolution of the images. Typically, motion vectors are computed on basis of blocks of pixels, e.g. based on an 8×8 pixel grid.

In general, motion vectors are required for all respective pixels of the images, i.e. at the resolution of images. U.S. Pat. No. 5,148,269 discloses a method for block erosion to refine the resolution of motion vector fields. The process of block erosion aims at refining the vector field to the pixel grid of the images. This is typically a recursive process: in a first erosion step, the grid is refined from an 8×8 to a 4×4 grid. In the next step, it is refined from 4×4 to 2×2, etc.

FIG. 1A shows one of the images 100 of a series of images. FIG. 1B shows a depth map 102 which has been computed for the image 100 of FIG. 1A, whereby the depth values of the depth map 102 are directly correlated to the estimated motion vectors. Objects close to the viewer show a high brightness (white) while objects far away are darker. Observing the blockiness, it is clear that the resolution of depth map 102 is lower than the resolution of the image 100.

FIG. 2A shows another depth map 204 which has been computed for the image 100 on basis of the same estimated motion vectors which have been used for computing a depth map 102 of FIG. 1B. The depth map 204 as shown in FIG. 2A is computed by means of erosion as disclosed in U.S. Pat. No. 5,148,269. It can be seen that the resolution of this depth map 204 is higher then the resolution of the depth map 102 as shown in FIG. 1B. However, the quality of this depth map 204 is still not sufficient for the purpose of rendering high-quality stereoscopic images. For instance the region 204 shows artefacts. By comparing FIG. 2A with FIG. 1A, it can be seen that the edges do not match. FIG. 2B shows a depth map 202, which has been computed according to the method of the invention.

It is an object of the invention to provide a method of the kind described in the opening paragraph, which provides an improved up scaling.

This object of the invention is achieved in that the scaling is based on a third structure of samples representing a second property, the third structure having the source resolution and based on a fourth structure of samples representing the second property, the fourth structure of samples having the target resolution, the method comprising:

assigning weight factors to respective first samples of the first structure of samples on basis of differences between respective third samples of the third structure of samples and fourth samples of the fourth structure of samples; and computing the second samples of the second structure of samples on basis of the first samples of the first structure of samples and the respective weight factors.

The up scaling according to the invention is based on the usage of data samples representing a second property. Another relevant aspect of the scaling according to the invention is the multi dimensional approach. To scale the first structure of samples having the source resolution, into the second structure of samples having the target resolution, a third structure of samples having the source resolution and a fourth structure of samples having the target resolution are applied.

Typically, a structure of samples corresponds to a matrix of data elements. However, the structures of samples may correspond to alternative configurations of data elements.

Further objects of the invention are to provide an up-scaling unit, an image processing apparatus and a computer program product of the kind described in the opening paragraph, which provides an improved up scaling.

These objects of the invention are achieved by the up-scaling unit, the image processing apparatus and the computer program product as described below.

Modifications of the up-scaling unit and variations thereof may correspond to modifications and variations thereof of the image processing apparatus, the method and the computer program product, being described.

These and other aspects of the up-scaling unit, the image processing apparatus, the method and the computer program product according to the invention will become apparent from and will be elucidated with respect to the implementations and embodiments described hereinafter and with reference to the accompanying drawings, wherein.

Figure 1B:
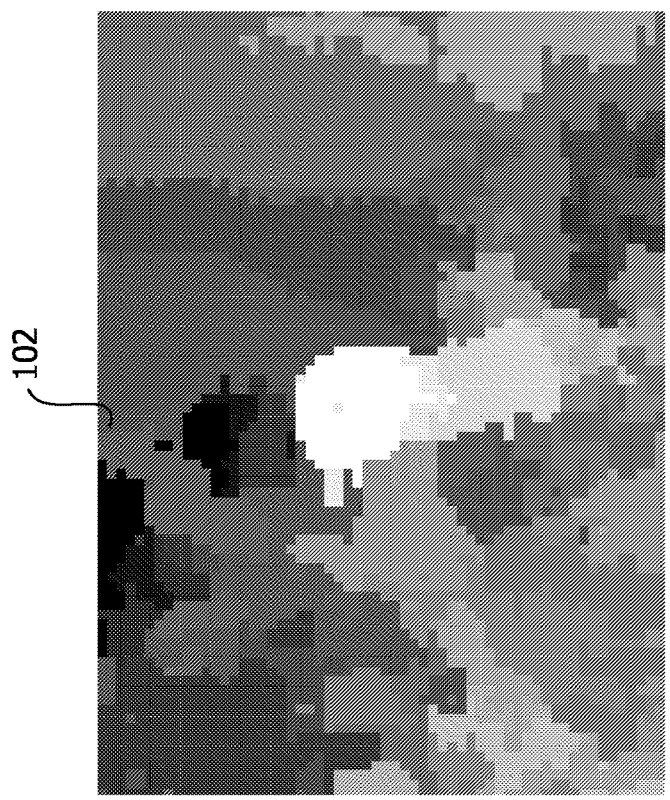
FIG. 1B shows a depth map which has been computed for the image of FIG. 1A.
Figure 1A:
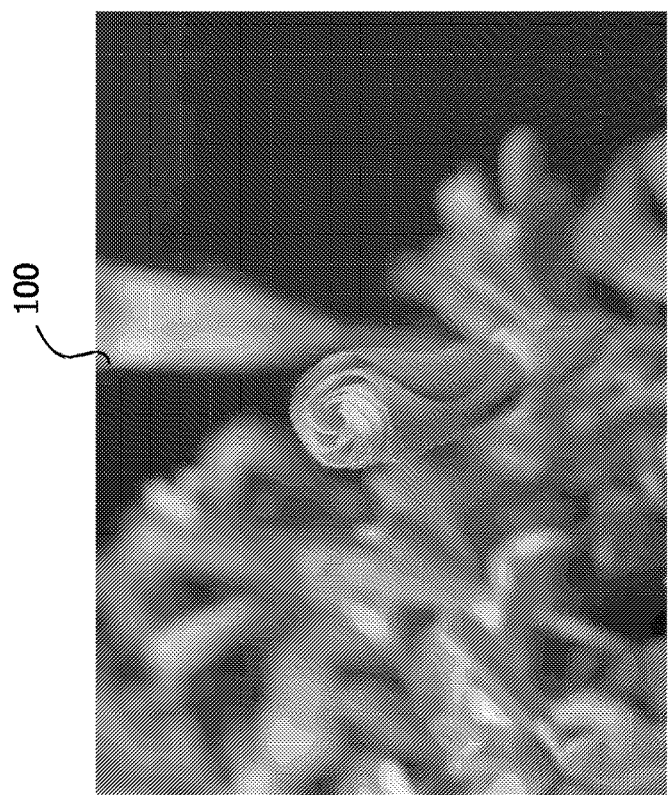
FIG. 1A shows an image.
Figure 2B:
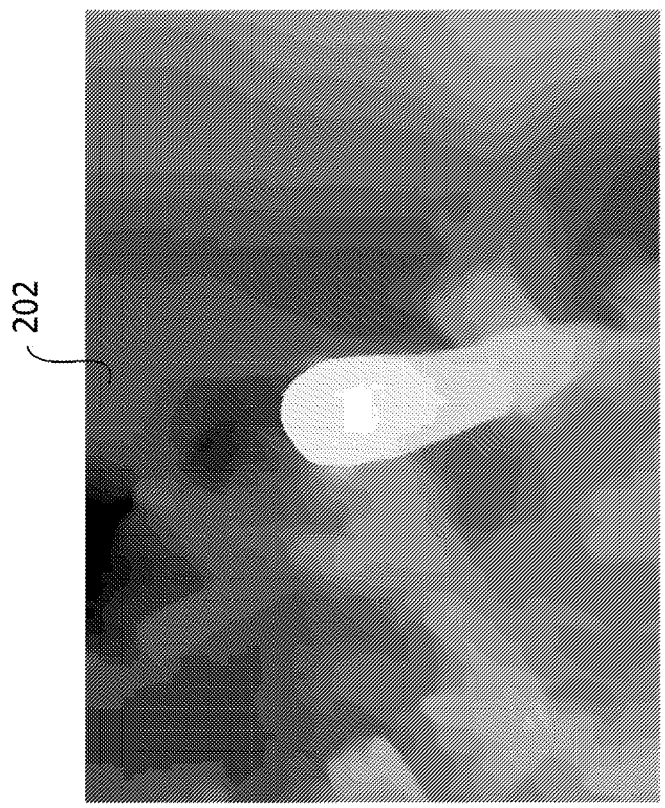
FIG. 2B shows a depth map which has been computed according to the method of the invention.
Figure 2A:
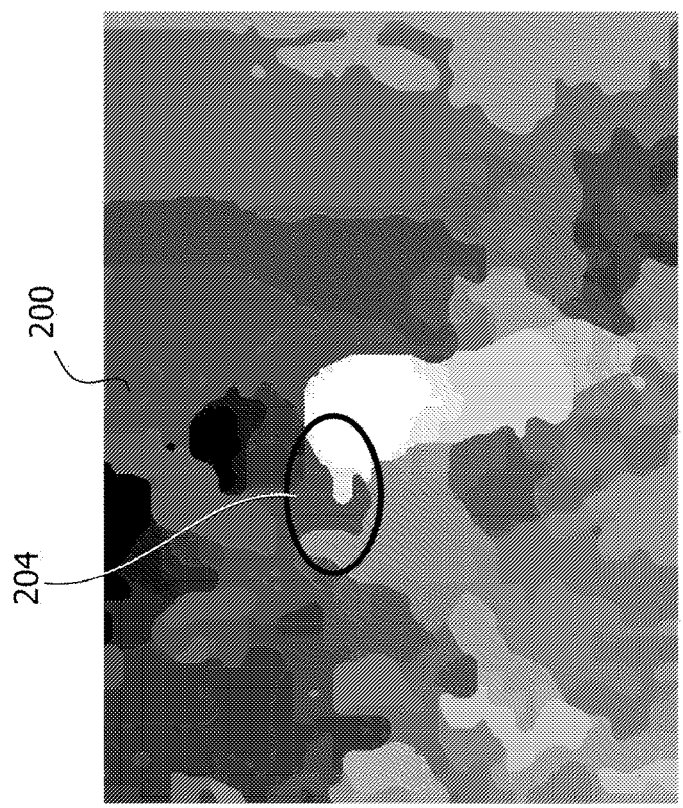
FIG. 2A shows another depth map which has been computed for the image of FIG. 1A, by means of erosion.
Figure 3A:
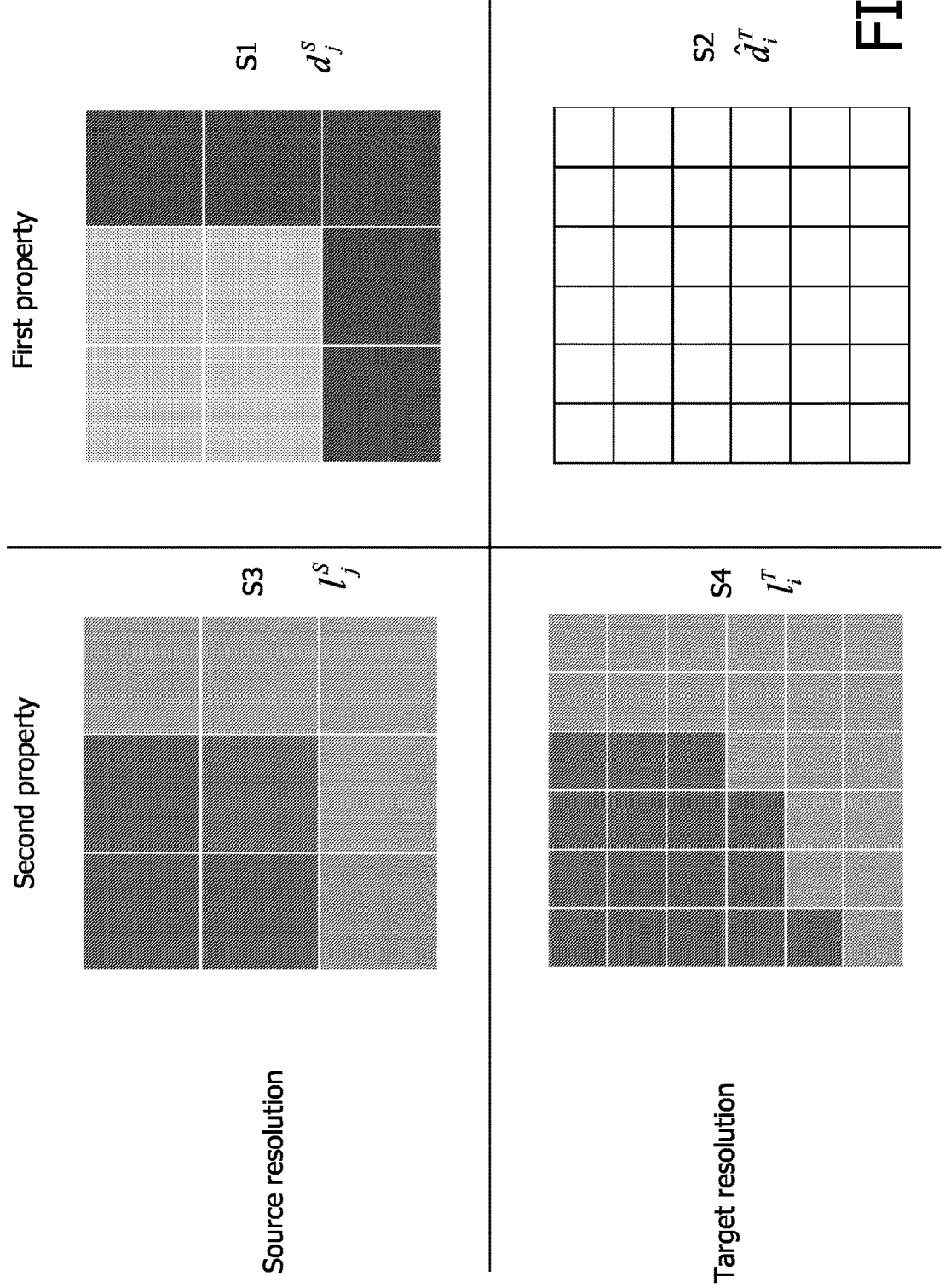
Figure 3B:
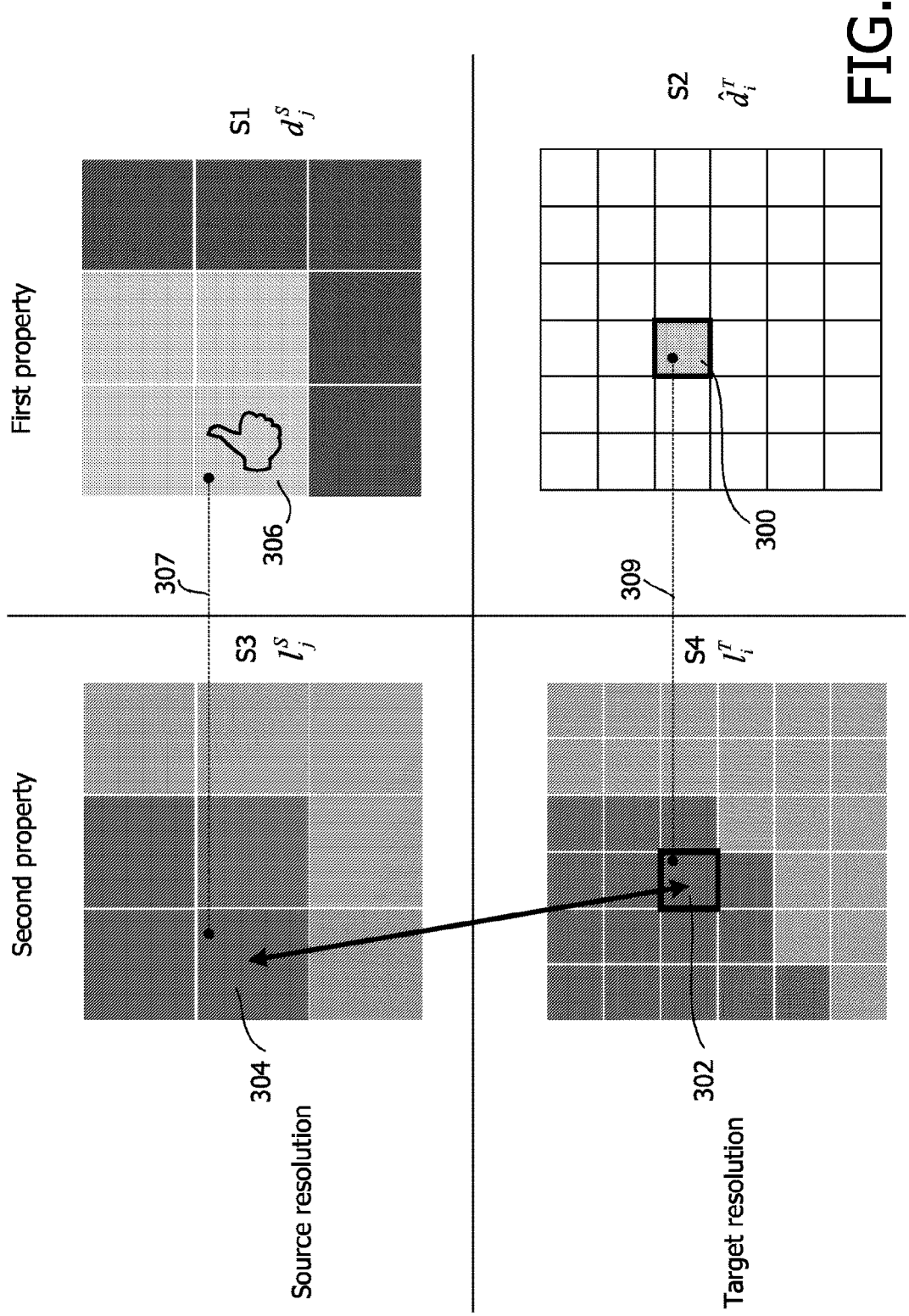
Figure 3C:
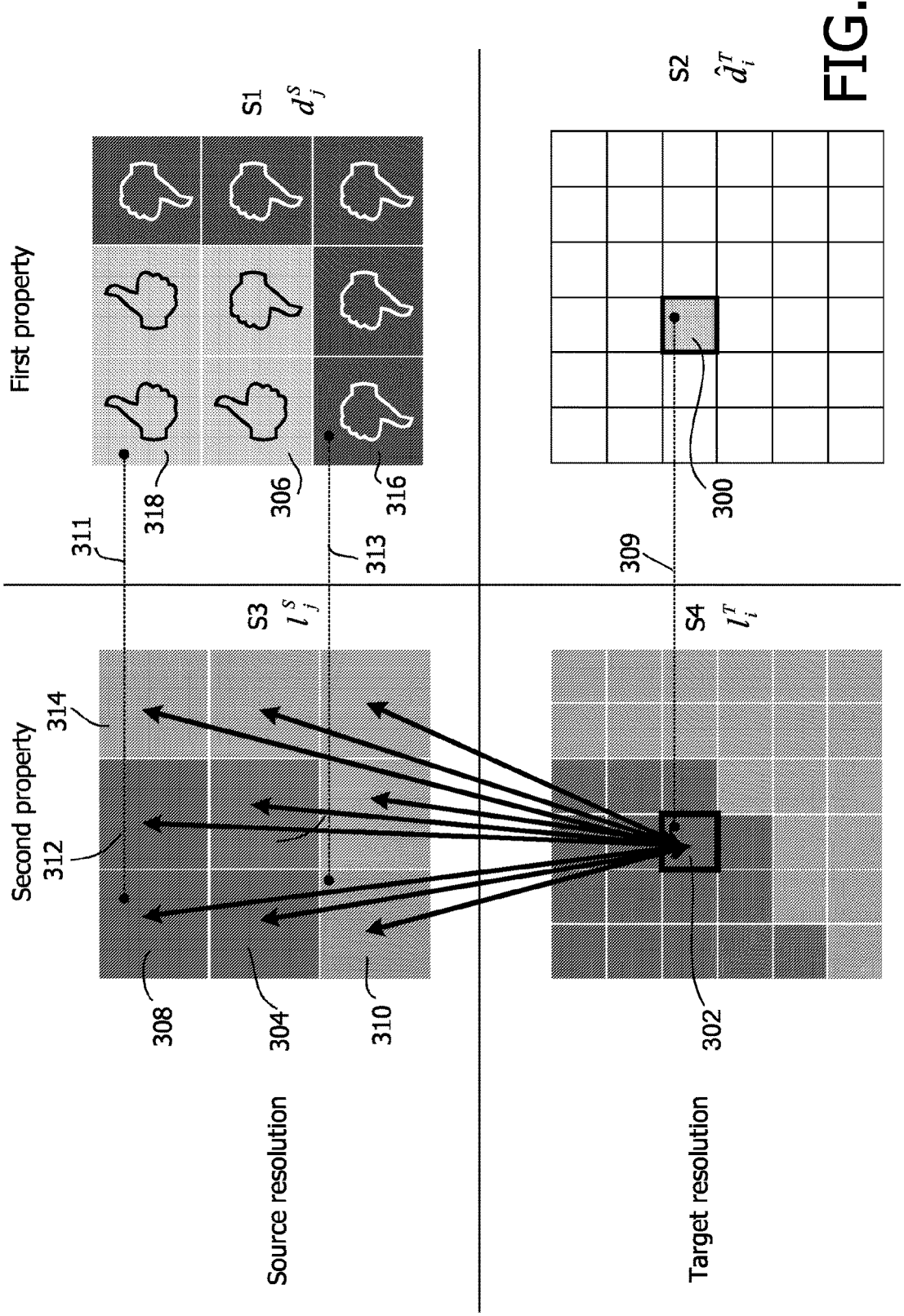
Figure 3E:
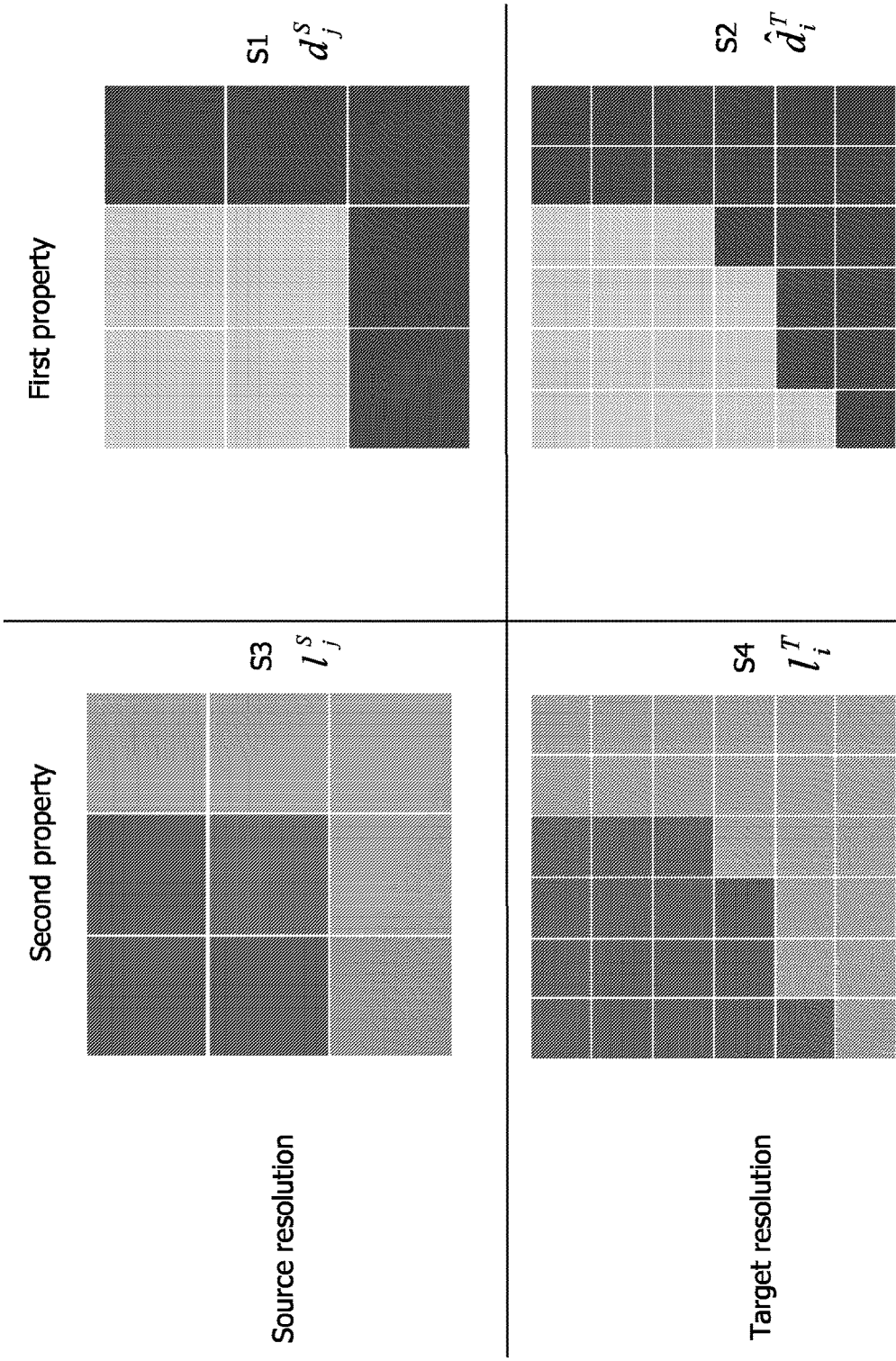
Figure 4:
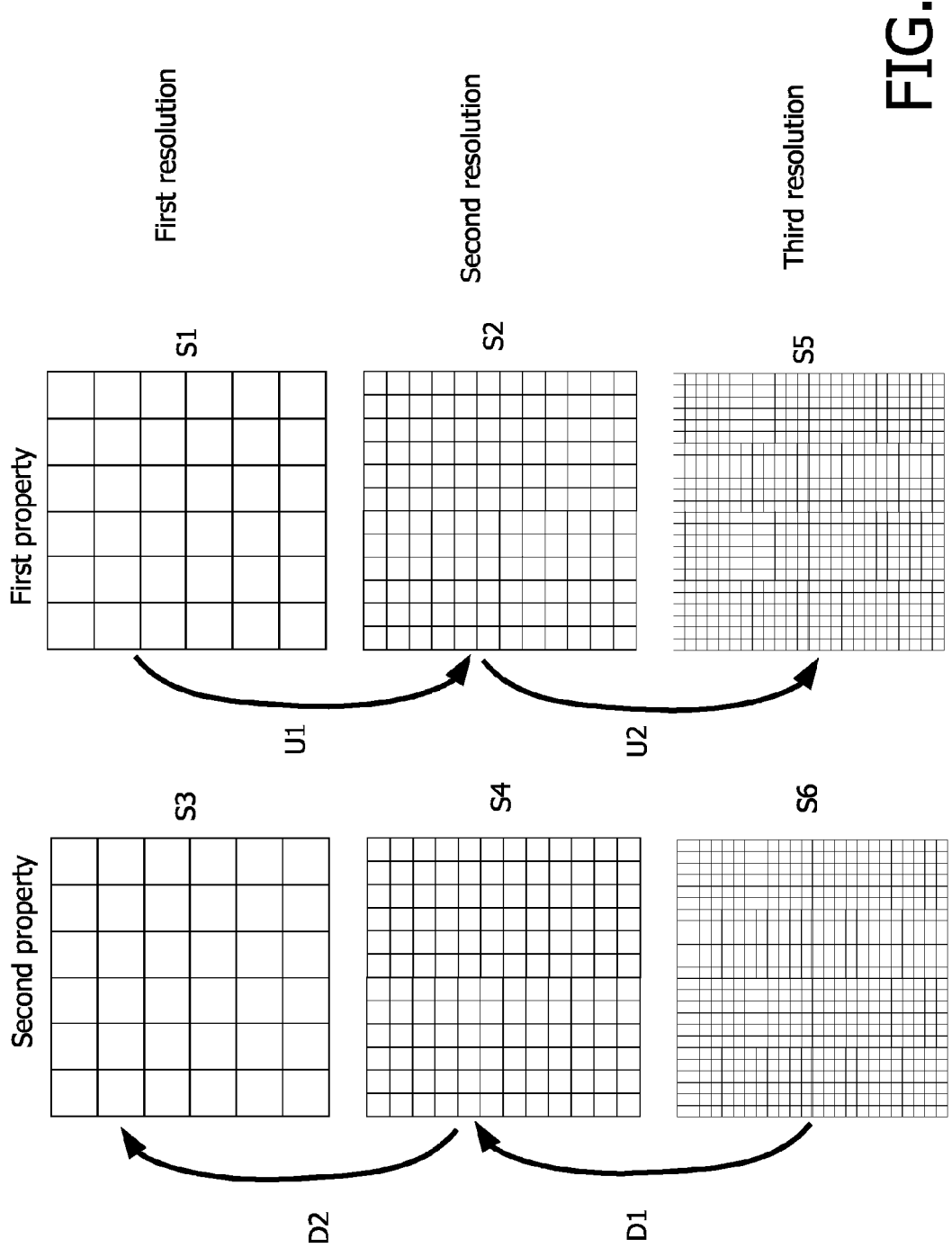
Figure 5B:
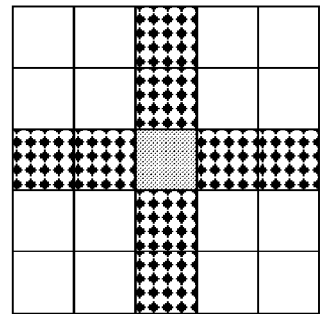
Figure 5A:
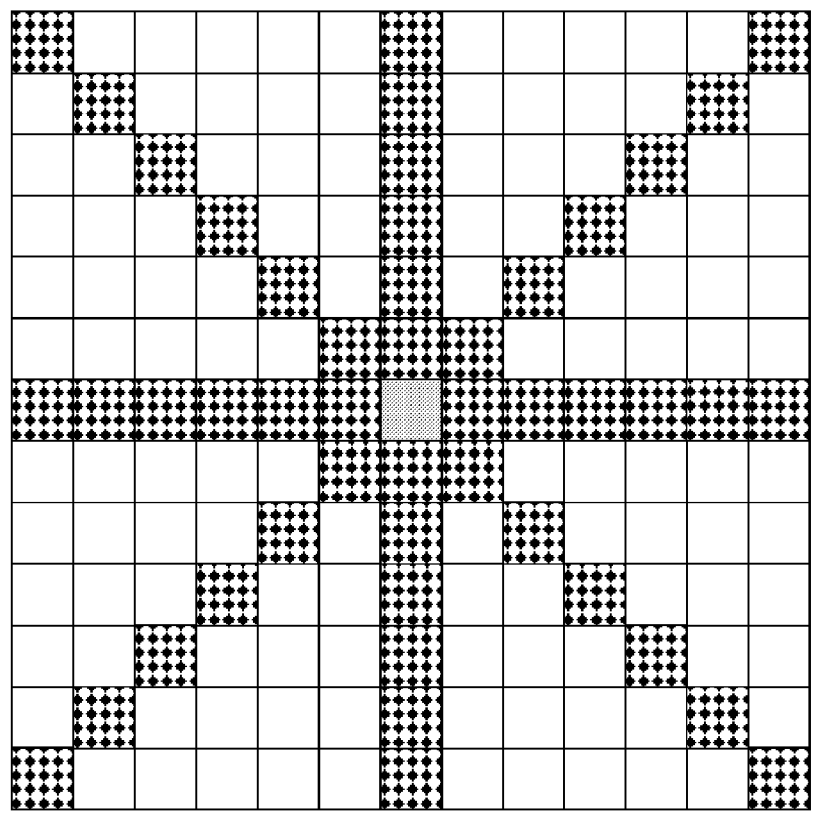
Figure 6:
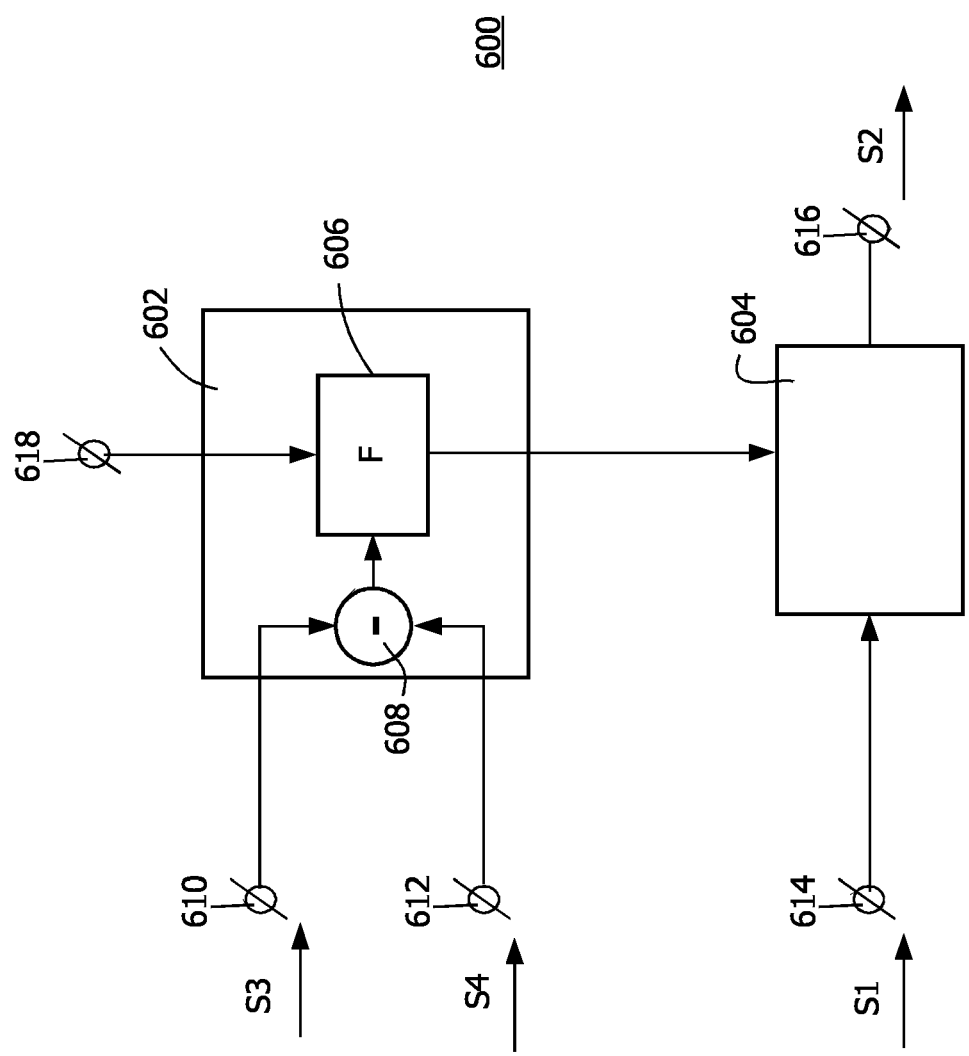
Figure 7:
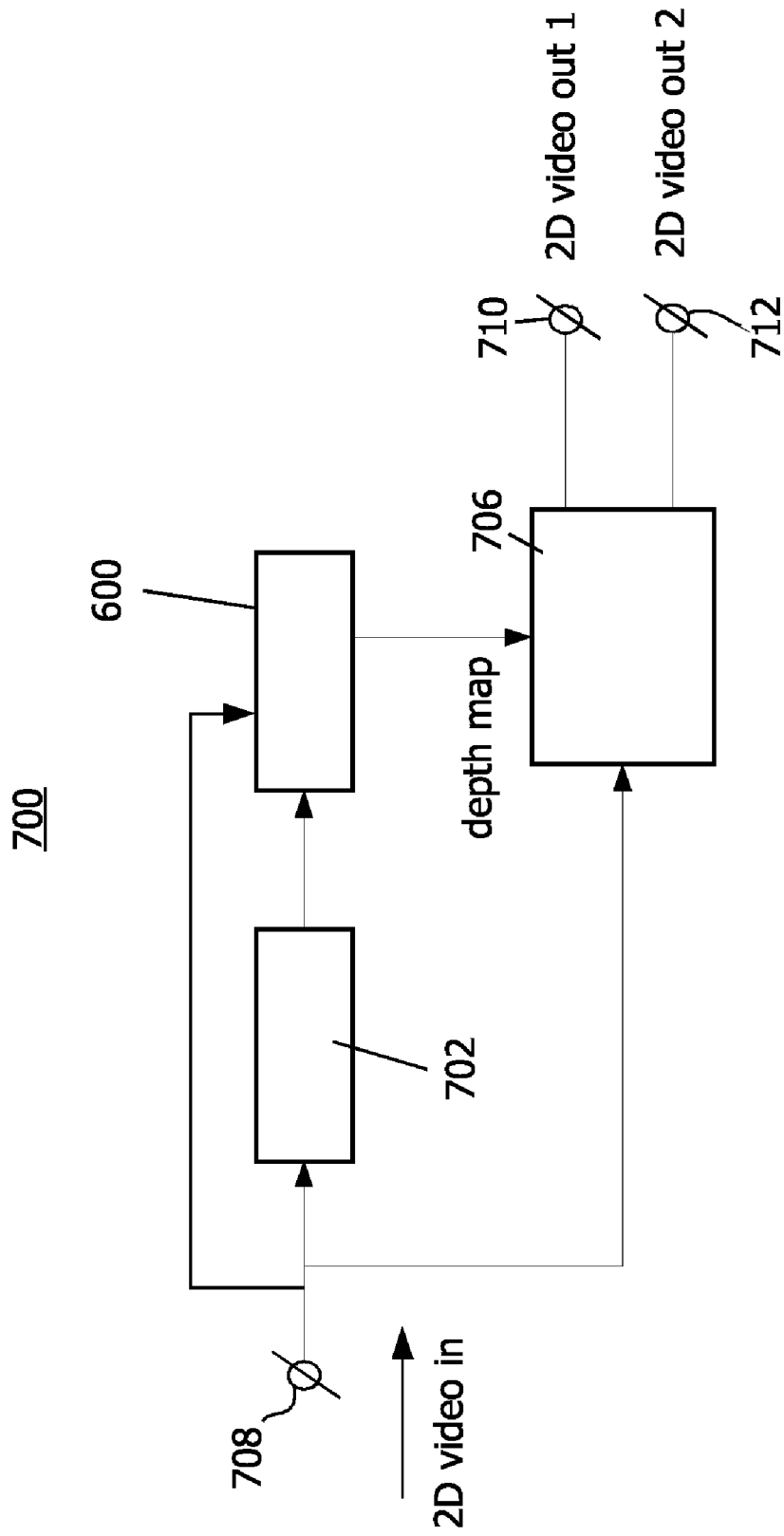

FIG. 3A schematically shows four structures of samples, whereby the values of the second structure of samples have not been computed yet;

FIG. 3B schematically shows an assignment of a first weight factor on basis of a first difference, to be applied for the computation of a first output sample;

FIG. 3C schematically shows the assignment of a number of weight factors on basis of respective differences;

FIG. 3D schematically shows an assignment of a first weight factor on basis of a first difference, to be applied for the computation of a second output sample;

FIG. 3E schematically shows the four structures of samples of FIG. 3A, whereby the values of the second structure of samples have been computed;

FIG. 4 schematically shows six structures of samples;

FIG. 5A schematically shows a first filter aperture;

FIG. 5B schematically shows a second filter aperture;

FIG. 6 schematically shows an up scaling unit according to the invention;

FIG. 7 schematically shows a multi-view image generation unit; and

FIG. 8 schematically shows an image processing apparatus according to the invention.

Same reference numerals are used to denote similar parts throughout the Figures.

In connection with FIG. 3A to FIG. 3E an embodiment of the method according to the invention will be described. FIG. 3A to FIG. 3E schematically show:

a first structure S1 of samples representing a first property, the first structure S1 of samples having the source resolution;

a second structure S2 of samples representing the first property, the second structure S2 of samples having the target resolution;

a third structure S3 of samples representing a second property, the third structure S3 of samples having the source resolution; and a fourth structure S4 of samples representing the second property, the fourth structure S4 of samples having the target resolution.

The method according to the invention aims at: up-scaling the first structure S1 of samples into the second structure S2 of samples; on basis of a third structure S3 of samples and a fourth structure S4 of samples.

The method comprises:

assigning weight factors to respective first samples of the first structure S1 of samples on basis of differences between respective third samples of the third structure S3 of samples and fourth samples of the fourth structure S4 of samples; and computing the second samples of the second structure S2 of samples on basis of the first samples of the first structure S1 of samples and the respective assigned weight factors.

FIG. 3A schematically shows four structure S1-S4 of samples, whereby the values of the second structure S2 of samples have not been computed yet. This can be seen as the initial situation of the method according to the invention.

Typically, the third samples of the third structure S3 of samples are computed on basis of the fourth samples of the fourth structure S4 of samples. In other words, the structure S3 of samples is computed by low-pass filtering the fourth structure S4 of samples, i.e. down scaling. It was discovered that the optimal filter is not the theoretically ideal sin(x)/x filter, but that a box average filter performs exceptionally well for this particular down scaling. Further, this down scaling filter may be applied on only a subset of the fourth samples of the fourth structure S4 of samples.

The first property may correspond to depth values or motion vectors. Accordingly, the first structure S1 of samples may correspond to an input depth map or motion vector field. Alternatively, the first structure S1 of samples may corresponds to a portion of an input depth map or motion vector field.

The second property may correspond to luminance and/or color. The third structure S3 of samples may correspond to a low resolution luminance/color image. Alternatively, the third structure S3 of samples corresponds to a portion of a relatively low resolution luminance/color image. The fourth structure S4 of samples may correspond to a relatively high resolution luminance/color image. That means a higher resolution than the low resolution of the third structure S3. Alternatively, the fourth structure S4 of samples corresponds to a portion of a relatively high resolution luminance/color image.

The different gray values in the FIGS. 3A-3E represent different values of the first property and the second property, i.e. luminance/color and depth values/motion vectors, respectively.

FIG. 3B schematically shows an assignment of a first one of the weight factors of a first one of the first samples 306 on basis of a first difference, the first one of the weight factors to be applied for the computation of a first output sample 300. The first output sample 300 corresponds to one of the second samples of the second structure S2 of samples.

The assigning of a first one of the weight factors of a first one of the first samples 306, is based on a first difference between a first one of the third samples 304 and a first one of the fourth samples 302. Preferably, the following relations between the different samples apply:

the respective coordinates of the first one of the first samples 306 and the first one of the third samples 304 are mutually equal. The correspondence between respective coordinates is indicated by the dashed line with reference number 307 between the first one of the first samples 306 and the first one of the third samples 304; and the respective coordinates of the first one of the fourth samples 302 and the first one of the second samples 300 are mutually equal. The correspondence between respective coordinates is indicated by the dashed line with reference number 309 between the first one of the fourth samples 302 and the first one of the second samples 300.

Because the first difference between the first one of the third samples 304 and the first one of a fourth samples 302 is relatively low, the first one of the weight factors is relatively high. This is indicated in FIG. 3B with the "positive thumb sign" for the first one of the first samples 306.

The assignment of further weight factors of further first samples is schematically indicated in FIG. 3C. For example, the assigning of a second one of the weight factors of a second one of the first samples 318, is based on a second difference between a second one of the third samples 308 and the first one of the fourth samples 302. The respective coordinates of the second one of the first samples 318 and the second one of the third samples 308 are mutually equal. The correspondence between the respective coordinates is indicated by the dashed line with reference number 311. Because the second difference between the second one of the third samples 308 and the first one of the fourth samples 302 is relatively low, the second one of the weight factors is relatively high. This is indicated in FIG. 3C with the "positive thumb sign" for the second one of the first samples 318.

The assigning of a third one of the weight factors of a third one of the first samples 316, is based on a third difference between a third one of the third samples 310 and the first one of the fourth samples 302. The respective coordinates of the third one of the first samples 316 and the third one of the third samples 310 are mutually equal. The correspondence between the respective coordinates is indicated by the dashed line with reference number 313. Because the third difference between the third one of the third samples 310 and the first one of the fourth samples 302 is relatively high, the third one of the weight factors is relatively low. This is indicated in FIG. 3C with the "negative thumb sign" for the third one of the first samples 316.

After having assigned the weight factors the second samples of the second structure S2 of samples can be computed on basis of the first samples of the first structure S1 of samples and the respective assigned weight factors.

Next the computation of the second samples of the second structure S2 will be described mathematically. Suppose that the first property corresponds to depth and that the first samples are denoted by $d_j^S$, whereby d represents depth, the superscript S refers to the source resolution and the subscript j corresponds to an index in the first structure of samples. The second samples are denoted by $\hat{d}_i^T$, whereby d represents depth, the superscript T refers to the target resolution and the subscript i corresponds to an index in the second structure of samples. In order to calculate an estimated depth value $\hat{d}_i^T$, surrounding depth values $d_j^S$ are used. Preferably, a weighted average filter is used:

$$\hat{d}_i^T = \frac{\sum_j w_{ij} d_j^S}{\sum_j w_{ij}} \tag{1}$$

This equation is used to compute depth values $\hat{d}_i^T$, i.e. the values of the second samples of the second structure S2. For every depth value $\hat{d}_i^T$, j surrounding depth values $d_j^S$ are used. The weight factors $w_{ij}$ are determined on basis of differences between values corresponding to the second property. For example, the second property corresponds to luminance. That means that luminance value $l_i^T$ of the fourth structure S4 are compared to the luminance values of the third structure S3, $l_j^S$. Preferably the following exponential function is used for the computation of the weight factors:

$$w_{ij} = 2^{-\alpha(|l_i^T - l_j^S|)} \tag{2}$$

Where α typically has a value like ⅛.

In case of RGB (Red, Green, Blue) data, i.e. the second property corresponding to color, each color component can contribute to the weight factors $$w_{ij} = 2^{-\alpha(|r_i^T - r_j^S| + |g_i^T - g_j^S| + |b_i^T - b_j^S|)} \tag{3}$$

In case of YUV data, the contribution of U and V data is less significant than the contribution of the luminance data l, a corresponding to Y:

$$w_{ij} = 2^{-\alpha(|l_i^T - l_j^S| + \frac{1}{2}|u_i^T - u_j^S| + \frac{1}{2}|v_i^T - v_j^S|)} \tag{4}$$

Apart from color differences, other image properties can show differences in the image contents. The inventors observed that addition of a simple texture measure also improves the results. The texture $t_i^T$ defined as the absolute difference between the maximum and the minimum luminance value in a group of samples. Then the weight factors can be defined as:

$$w_{ij} = 2^{-\alpha(|l_i^T - l_j^S| + |t_i^T - t_j^S|)} \tag{5}$$

It will be clear that all samples of the second structure S2 of samples have to be computed. So, after the computation of the first one 300 of the second samples of the second structure S2 the second one 322 of the second samples of the second structure S2 will be computed. Again, this is based on assigning weight factors followed by filtering on basis of the assigned weight factors.

FIG. 3D schematically shows the assignment of a fourth weight factor on basis of a fourth difference, to be applied for the computation of the second output sample, i.e. the second one 322 of the second samples of the second structure S2 of samples.

The assigning of the fourth one of the weight factors of the first one of the first samples 306 is based on a fourth difference between the first one of the third samples 304 and a second one of the fourth samples 320. Preferably, the following relations between the different samples apply:

the respective coordinates of the first one of the first samples 306 and the first one of the third samples 304 are mutually equal. The correspondence between respective coordinates is indicated by the dashed line with reference number 307 between the first one of the first samples 306 and the first one of the third samples 304; and the respective coordinates of the second one of the fourth samples 320 and the second one of the second samples 322 are mutually equal. The correspondence between respective coordinates is indicated by the dashed line with reference number 311 between the second one of the fourth samples 320 and the second one of the second samples 322.

Because the fourth difference between the first one of the third samples 304 and the second one of the fourth samples 320 is relatively low, the first one of the weight factors is relatively high. This is indicated in FIG. 3D with the "positive thumb sign" for the first one of the first samples 306.

Similar as disclosed above in connection with FIG. 3C, subsequent weight factors for the computation of the second one 322 of the second samples of the second structure S2 will be computed.

FIG. 3E schematically shows the four structures of samples of FIG. 3A, whereby the values of the second structure of samples have been computed. In other words, FIG. 3E schematically shows the result of computations of the second samples of the second structure S2. FIG. 3E schematically shows that the values of second samples are based on the values of the first samples (grey values). The "shape" of the "object" in the second structure S2 corresponds to the "shape" of the "object" in the fourth structure S4. That means that, in this example the depth values are adapted to the luminance values of the corresponding image.

Optionally, an extra factor is applied to weight the various weight factors $w_{ij}$ whereby the extra factor is related to the reliability of the values of the first samples.

$$w_{ij}^r = r_j w_{ij} \tag{6}$$

Then the modified weight factors are used instead of the previously specified weight factors (see Equations 2-5). Such a reliability factor can for example be obtained from a motion estimator/depth estimator. The estimator can determine where de-occlusion areas are. Values in these areas are not as reliable, so should count with a lower weight. Alternatively, the reliability factor is directly based on luminance values of the input images of the estimator: motion vectors and depth values related to homogeneous image areas are to be trusted less. The reliability factor may also be derived from a depth signal: a decoder decoding a depth signal could indicate when high quantization was applied during encoding, in which case depth might also be less reliable.

FIG. 4 schematically shows six structures of samples S1-S6. As explained in connection with FIGS. 3A-3E, the method according to the invention aims at up-scaling U1 the first structure S1 of samples into the second structure S2 of samples, on basis of a third structure S3 of samples and a fourth structure S4 of samples. Typically, the up scaling is a first step U1 from a sequence of up-scaling steps. After the first up-scaling step U1 a second up-scaling step U2 may follow. Even more than two up-scaling steps may be performed (not depicted). The second up-scaling step U2 is similar to the first up-scaling step U1. Hence, the second up scaling step U2 means up scaling the second structure S2 of samples into the fifth S5 structure of samples on basis of the fourth structure S4 of samples and the sixth structure S6 of samples. The output of first up scaling step U1, i.e. the second structure S2 of samples is used as input for the second up scaling step U2. The up scaling is a recursive process.

Typically, the samples of the second property are available at a relatively high resolution at the beginning of the total scaling process. For instance there is an input image represented by a structure of samples S6, being a matrix of 1024*1024 elements. By means of down sampling, or optionally a cascade of down sampling steps D1 and D2, a number of additional structures of samples S3 and S4 are computed, which are, required for the respective up-scaling steps U1 and U2 of the method according to the invention. For instance, the sixth structure of samples S6 is downscaled D1 with a factor two into the fourth structure of samples S4, being a matrix of 512*512 elements. Subsequently, the fourth structure S4 of samples is downscaled D2 with a factor two into the third structure of samples S3, being a matrix of 256*256 elements. Alternatively, the sixth structure of samples S6 is directly downscaled with a factor four into the third structure of samples S3.

It will be clear that the downscaling steps are related to the up-scaling steps, since for the up scaling it is required to have available structures of samples of different properties, having corresponding resolutions. The resolution of the third S3 structure of samples and the resolution of the first S1 structure of samples are preferably mutually equal. The same applies for the second S2 structure of samples and the fourth S4 structure of samples and for the fifth structure S5 of samples and the sixth structure S6 of samples.

Although it is preferred to perform the up scaling recursively, e.g. from 8*8 to 4*4 to 2*2 to 1*1, it is also possible to perform the up scaling in one step, e.g. from 8*8 to 1*1. Hereby, x*x refers to the low resolution compared with the high resolution.

The up scaling according to the invention is based on filtering a number of input samples, i.e. first samples S1 of the first structure of samples, to compute output samples, i.e. second samples of the second structure S2 of samples. As specified above, the input samples are weighted with respective weight factors, which are based on differences between samples related to the second property. The configuration of input samples which is taken into account for the computation of a particular output sample is called a filter aperture. The filter aperture determines which input samples are applied for the computation of the particular output sample. FIG. 5A schematically shows a first filter aperture and FIG. 5B schematically shows a second filter aperture.

Since an error in the first up-scaling U1 (e.g. from 8×8 to 4×4) is clearly more visible and annoying than errors in later steps, it seems logical to spend more effort in attempting to avoid mistakes in this first step. Furthermore, this first step is executed on a coarse grid so the amount of samples to process is relatively small (at each step, the amount of samples increases 4-fold if the up scaling is a factor two in two directions). So it is advantageous to apply the more advanced protection methods (using multiple color components, and/or using reliability factors). With these protection methods it is possible to use a wide filter aperture. As an example, we found that it is even possible to use a radius of 6 (8×8) samples in 8 directions. This is illustrated by the shaded blocks in FIG. 5A. FIG. 5B shows a simplified aperture, more suitable for successive steps.

FIG. 6 schematically shows an up scaling unit 600 according to the invention. The up-scaling unit 600 is arranged to scale a first structure S1 of samples representing a first property, the first structure S1 having a source resolution, into a second structure S2 of samples representing the first property, the second structure S2 having a target resolution, on basis of a third structure S3 of samples representing a second property, the third structure S3 having the source resolution and on basis of a fourth structure S4 of samples representing the second property, the fourth structure S4 of samples having the target resolution.

The up scaling unit 600 comprises a first input connector 614 for receiving the first samples of the first structure of samples S1, a second input connector 610 for receiving the third samples of the third structure of samples S3, a third input connector 612 for receiving the fourth samples of the fourth structure of samples S4 and a first output connector 616 for providing the second samples of the second structure of samples S2.

The up-scaling unit 600 comprises:

a weight factors assigning unit 602 for assigning weight factors to respective first samples of the first structure of samples on basis of differences between respective third samples of the third structure of samples and fourth samples of the fourth structure of samples; and a computing unit 604 for computing the second samples of the second structure of samples on basis of the first samples of the first structure of samples and the respective weight factors.

The weight factors assigning unit 602 comprises:

a subtraction unit 608 for computing the difference between respective third samples and fourth samples. Preferably, the subtraction unit is arranged to compute absolute differences; and a mapping unit 606 for mapping the differences being computed by the subtraction unit 608 in to respective weight factors. Preferably, the mapping unit 606 is arranged to perform a non-linear function for mapping an input value, i.e. difference, into an output value, i.e. weight factor. Preferably the non-linear function is an exponential function, which transforms a relatively large difference to a relatively small weight factor. Preferably, the mapping unit 606 is implemented by means of a LUT (look up table)

Optionally, the up-scaling unit 600 comprises a fourth input connector 618 for receiving reliability values as described in connection with Equation 6.

The weight factors assigning unit 602 and computing unit 604 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally, an application specific integrated circuit provides the disclosed functionality.

FIG. 7 schematically shows a multi-view image generation unit 700 comprising:

a depth map generation unit 702 for generating depth maps for the respective input images on basis of the images. The depth maps comprise depth values representing distances to a viewer, for respective blocks of pixels of the images. So, the resolution of the depth maps is lower than the resolution of the input images;

an up scaling unit 600 as described in connection with FIG. 6 for up scaling the depth maps into higher resolution depth maps, on basis of the input images. The resolution of the higher resolution depth maps corresponds to the resolution of the input images; and a rendering unit 706 for rendering multi-view images on basis of the input images and the respective higher resolution depth maps, which are provided by the up scaling unit 600.

The multi-view image generation unit 700 is arranged to generate a sequence of multi-view images on basis of a sequence of video images. The multi-view image generation unit 700 is provided with a stream of video images at the input connector 708 and provides two correlated streams of video images at the output connectors 710 and 712, respectively.

These two correlated streams of video images are to be provided to a multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3D impression. It might be that the first one of the correlated streams of video images corresponds to the sequence of video images as received and that the second one of the correlated streams of video images is rendered on basis of the sequence of video images as received. Preferably, both streams of video images are rendered on basis of the sequence of video images image as received. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

FIG. 8 schematically shows an embodiment of the image processing apparatus 800 according to the invention, comprising:

receiving means 802 for receiving a signal representing input images;

a multi-view image generation unit 700 as described in connection with FIG. 7; and a display device 806 for displaying the output images of the multi-view image generation unit 700.

The signal may be a broadcast signal received via an antenna or cable but may also be a signal from a storage device like a VCR (Video Cassette Recorder) or Digital Versatile Disk (DVD). The signal is provided at the input connector 810. The image processing apparatus 800 might e.g. be a TV. Alternatively the image processing apparatus 800 does not comprise the optional display device but provides the output images to an apparatus that does comprise a display device 806. Then the image processing apparatus 800 might be e.g. a set top box, a satellite-tuner, a VCR player, a DVD player or recorder. Optionally the image processing apparatus 800 comprises storage means, like a hard disk or means for storage on removable media, e.g. optical disks. The image processing apparatus 800 might also be a system being applied by a film-studio or broadcaster.

The present invention has been described in a multi-view image application but it also can be applied in other applications, e.g. a motion compensated scan rate conversion, whereby motion vectors are computed on a 8*8 block basis. The up scaling according to the invention can be applied to compute motion vectors per pixel in order to interpolate intermediate images.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names. No specific sequence of acts is intended to be required unless specifically indicated.

The invention claimed is:

1. A method of up scaling a first structure of samples representing a first property, the first structure having a source resolution, into a second structure of samples representing the first property, the second structure having a target resolution, on basis of a third structure of samples representing a second property, the third structure having the source resolution and on basis of a fourth structure of samples representing the second property, the fourth structure of samples having the target resolution, the method comprising:

receiving the first structure of samples at a first processor input;

receiving the third structure of samples at a second processor input;

receiving the fourth structure of samples at a third processor input;

wherein the processor is configured to:

assign weight factors to respective first samples of the first structure of samples on basis of subtraction between respective third samples of the third structure of samples and fourth samples of the fourth structure of samples; and compute the second samples of the second structure of samples on basis of the first samples of the first structure of samples and the respective weight factors.

2. A method of up scaling as claimed in claim 1, wherein the weight factors are determined on basis of a non-linear function of the subtraction.

3. A method of up scaling as claimed in claim 2, wherein the non-linear function is an exponential function.

4. A method of up-scaling as claimed in claim 1, wherein assigning a first one of the weight factors of a first one of the first samples, to be used for computing a first one of the second samples, is based on a first subtraction between a first one of the third samples and a first one of the fourth samples, the respective coordinates of the first one of the first samples and the first one of the third samples being mutually equal.

5. A method of up-scaling as claimed in claim 1, wherein assigning a first one of the weight factors of a first one of the first samples, to be used for computing a first one of the second samples, is based on a first subtraction between a first one of the third samples and a first one of the fourth samples, the respective coordinates of the first one of the fourth samples and the first one of the second samples being mutually equal.

6. A method of up scaling as claimed in claim 1, wherein the first property corresponds to depth.

7. A method of up scaling as claimed in claim 1, wherein the first property corresponds to motion.

8. A method of up scaling as claimed in claim 1, wherein the second property corresponds to color or luminance.

9. A method of up scaling as claimed in claim 1, wherein the second property is based on color texture.

10. A method of up scaling as claimed in claim 1, the method further comprising downscaling the fourth structure of samples into the third structure of samples.

11. A method of up scaling as claimed in claim 10, wherein a box filter is used for downscaling.

12. A method of up scaling as claimed in claim 1, wherein assigning weight factors to respective first samples of the first structure of samples is further based on respective reliability values of the first samples of the first structure of samples.

13. A method of up-scaling as claimed in claim 1, the up-scaling comprising:
- obtaining by a processor an intermediate structure of samples representing the first property, the intermediate structure having an intermediate resolution being higher than the source resolution and lower than the target resolution; and
- obtaining the second structure of samples on basis of the intermediate structure of samples, wherein a first filter configuration being applied at the first scaling step and a second filter configuration being applied at the second scaling step are mutually different.

14. An up-scaling unit for up-scaling a first structure of samples representing a first property, the first structure having a source resolution, into a second structure of samples representing the first property, the second structure having a target resolution, on basis of a third structure of samples representing a second property, the third structure having the source resolution and on basis of a fourth structure of samples representing the second property, the fourth structure of samples having the target resolution, the up-scaling unit comprising at least one processor configured to:
- assign weight factors to respective first samples of the first structure of samples on basis of subtraction between respective third samples of the third structure of samples and fourth samples of the fourth structure of samples; and
- compute the second samples of the second structure of samples on basis of the first samples of the first structure of samples and the respective weight factors.

15. An image processing apparatus comprising the up-scaling unit as claimed in claim 14.

16. A non-transitory computer-readable medium, in which a computer program comprising program code means, when being executed by a processor is adapted to
- up-scale a first structure of samples representing a first property, the first structure having a source resolution, into a second structure of samples representing the first property, the second structure having a target resolution, on basis of a third structure of samples representing a second property, the third structure having the source resolution and on basis of a fourth structure of samples representing the second property, the fourth structure having the target resolution,
- by assigning weight factors to respective first samples of the first structure of samples on basis of subtraction between respective third samples of the third structure of samples and fourth samples of the fourth structure of samples; and by computing the second samples of the second structure of samples on basis of the first samples of the first structure of samples and the respective weight factors.

* * * * *